United States Patent
Needham

(10) Patent No.: US 11,998,934 B2
(45) Date of Patent: *Jun. 4, 2024

(54) DRIVE CIRCUIT FOR ESTIMATING FLUID FLOW BASED ON VALVE CLOSURE TIME AND FLUID APPLICATION SYSTEM INCLUDING SAME

(71) Applicant: Capstan Ag Systems, Inc., Topeka, KS (US)

(72) Inventor: Duane Needham, Berkeley, CA (US)

(73) Assignee: Capstan Ag Systems, Inc., Topeka, KS (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/249,594

(22) Filed: Mar. 5, 2021

(65) Prior Publication Data

US 2021/0187523 A1 Jun. 24, 2021

Related U.S. Application Data

(60) Division of application No. 16/045,404, filed on Jul. 25, 2018, now Pat. No. 10,953,414, which is a
(Continued)

(51) Int. Cl.
*B05B 1/30* (2006.01)
*B05B 12/00* (2018.01)
(Continued)

(52) U.S. Cl.
CPC .......... *B05B 1/3013* (2013.01); *B05B 1/3053* (2013.01); *B05B 12/004* (2013.01);
(Continued)

(58) Field of Classification Search
CPC ... B05B 1/3013; B05B 1/3053; B05B 12/004; B05B 12/006; B05B 12/082; F16K 31/0655; F16K 37/00
(Continued)

(56) References Cited

U.S. PATENT DOCUMENTS 2,325,878 A * 8/1943 Ray ..................... F16K 31/0658
251/129.15
3,622,991 A * 11/1971 Lehrer ..................... G06K 7/06
340/5.5
(Continued)

FOREIGN PATENT DOCUMENTS

DE 102011007580 A1 10/2012
EP 2165770 A1 3/2010

OTHER PUBLICATIONS

Office Action issued in European Patent Application No. 20168541.9, dated Jun. 15, 2022, 6 pages.
(Continued)

*Primary Examiner* — Chee-Chong Lee
(74) *Attorney, Agent, or Firm* — Armstrong Teasdale LLP

(57) ABSTRACT

A drive circuit for a solenoid valve having a coil and a poppet configured to translate within the coil includes a drive switch operable to de-energize the coil to translate the poppet toward a closed position, a sensor configured to detect the poppet translating within the solenoid valve, and a drive circuit configured to energize and de-energize the coil of the solenoid valve to translate the poppet of the solenoid valve between an open position and a closed position. The drive circuit includes a controller configured to receive a closure signal from the sensor, determine a closing time of the solenoid valve based on the closure signal, determine a time delay between de-energizing the coil and the determined closing time, and determine a fluid flow value of fluid flowing through the solenoid valve based on the determined time delay.

16 Claims, 11 Drawing Sheets

Related U.S. Application Data continuation of application No. 14/926,901, filed on Oct. 29, 2015, now Pat. No. 10,058,879.

(51) Int. Cl.
| | |
|---|---|
| *B05B 12/08* | (2006.01) |
| *F16K 31/06* | (2006.01) |
| *G01F 9/00* | (2006.01) |
| *G05D 7/00* | (2006.01) |
| *G05D 7/06* | (2006.01) |
| *B05B 1/20* | (2006.01) |
| *B05B 13/00* | (2006.01) |
| *B05B 15/50* | (2018.01) |

(52) U.S. Cl.
CPC .......... *B05B 12/006* (2013.01); *B05B 12/082* (2013.01); *F16K 31/0651* (2013.01); *F16K 31/0655* (2013.01); *F16K 31/0675* (2013.01); *G01F 9/001* (2013.01); *G05D 7/00* (2013.01); *G05D 7/0635* (2013.01); *B05B 1/20* (2013.01); *B05B 13/005* (2013.01); *B05B 15/50* (2018.02)

(58) Field of Classification Search
USPC .......................................................... 239/1
See application file for complete search history.

(56) References Cited

U.S. PATENT DOCUMENTS

| | | | |
|---|---|---|---|
| 3,777,977 A * | 12/1973 | Regneault | ............ F02M 47/027 239/96 |
| 5,052,174 A | 10/1991 | Bak | |
| 5,324,359 A | 6/1994 | Cleveland et al. | |
| 5,499,157 A | 3/1996 | Younessi et al. | |
| 5,704,546 A | 1/1998 | Henderson et al. | |
| 5,881,919 A | 3/1999 | Womac et al. | |
| 5,908,161 A | 6/1999 | Womac et al. | |
| 5,967,066 A | 10/1999 | Giles et al. | |
| 6,019,347 A | 2/2000 | Adams et al. | |
| 6,374,624 B1 | 4/2002 | Cholkeri et al. | |
| 7,311,004 B2 | 12/2007 | Giles | |
| 7,502,665 B2 | 3/2009 | Giles et al. | |
| 7,742,842 B2 | 6/2010 | Giles et al. | |
| 7,826,930 B2 | 11/2010 | Giles et al. | |
| 8,191,795 B2 | 6/2012 | Grimm et al. | |
| 2006/0102234 A1 | 5/2006 | Meisel | |
| 2006/0151544 A1 | 7/2006 | Greenwald et al. | |
| 2006/0225489 A1 | 10/2006 | Giles et al. | |
| 2006/0265106 A1 | 11/2006 | Giles et al. | |
| 2012/0228395 A1 | 9/2012 | Needham et al. | |
| 2014/0299673 A1 | 10/2014 | Grimm et al. | |

OTHER PUBLICATIONS

Extended European Search Report for European Patent Application No. 16174851.2, dated Mar. 23, 2017, 9 pages.

Extended European Search Report issued in connection with European Patent Application No. 20168541.9-1010, dated Jul. 7, 2020, 6 pages.

Non-Final Office Action issued by the USPTO for U.S. Appl. No. 16/045,404, dated Oct. 7, 2020, 20 pages.

* cited by examiner

DRIVE CIRCUIT FOR ESTIMATING FLUID FLOW BASED ON VALVE CLOSURE TIME AND FLUID APPLICATION SYSTEM INCLUDING SAME

CROSS-REFERENCE TO RELATED APPLICATIONS

This application is a divisional of U.S. patent application Ser. No. 16/045,404, filed on Jul. 25, 2018, which is a continuation of U.S. patent application Ser. No. 14/926,901, filed on Oct. 29, 2015, the disclosures of which are hereby incorporated by reference in their entirety.

BACKGROUND

The present disclosure relates generally to fluid distribution systems and, more particularly, to diagnostic systems for use with fluid distribution systems and methods of diagnosing such systems.

In agricultural spraying, the flow rate through a spray nozzle is an important factor in delivering a specified amount of agrochemical to a specified area. Most agrochemicals such as crop protection agents and many fertilizers are applied as liquid solutions, suspensions, and emulsions that are sprayed onto the target fields. Certain agrochemicals, such as anhydrous ammonia, are dispensed into soil through dispensing tubes positioned behind knives or plows that prepare the soil for application.

Typically, the agrochemical liquid is supplied by powered pumps to simple or complex orifice nozzles that atomize the liquid stream into spray droplets. Nozzles are often selected primarily on the desired range of flow rates needed for the job and secondarily on the range of liquid droplet size spectra and spray distribution patterns they produce.

Increasing concerns over inefficient agrochemical use, the cost of agrochemicals and inadvertent spray drift or pesticide run-off have resulted in attempts to improve the quality, precision, accuracy and reliability of application of agrochemicals. This has led to increased use of electronic control systems and GPS-guided operations. Growth in these "precision agriculture" products and strategies has led to greater demand for "variable rate" technologies and the fluid handling means to alter spray liquid flow rates.

New sprayer models may have booms of 30 m (approximately 90 ft) widths and allow application at speeds up to 30 km/hr (20 mph) or higher. Faster ground speeds and wider spray booms can lead to application errors that are significant yet unavoidable with existing spray technology. For example, if the sprayer is traversing the edge of a field while scribing about a 100 m radius (actually, a very gentle turn), the outer nozzles are traveling 35% faster than the inner nozzles. At a 50 m radius, the difference in nozzle ground speeds is 85%. With sharp turns, such as at the end of a pass, the inner nozzles will travel backwards, thereby retracing and overdosing previously sprayed areas, while the outer nozzles will significantly accelerate giving their associated land areas sparse coverage of chemical. Unless the flow rate from each nozzle is individually adjusted to compensate for these differences in travel speeds, application errors may occur.

Individual control of spray nozzles or nozzle assemblies is of growing importance in agrochemical application. As individual control increases, the need for individual flow monitoring will increase since feedback is often needed for closed loop control. Even with a linear control strategy, such as the binary control of multiple nozzles or pulse width modulation, confirmation of proper flow is important.

As the spray application industry adopts larger liquid storage tanks on mobile equipment, operators are likely to make fewer stops for refilling and cover greater land area between stops. Consequently, clogged nozzles or other problems on the boom are unlikely to be detected while significant land areas are being treated. For example, assuming a 30 km/hr ground speed, a 30 m boom width and 50 l/ha (apprx. 5 gal/acre) application rate, a 4000 l (apprx. 1000 gal) tank will cover 200 acres in apprx. 1 hour. A single nozzle in this example would treat apprx. 3.5 acres per tank load and a single undetected nozzle malfunction would correspond to this 3.5 acre area receiving an incorrect, or perhaps zero, dose of agrochemical.

Additionally, wider boom widths, travel speeds and vehicle sizes increasingly restrict an operator's view of the boom and the opportunities to view the boom while driving. On modern agricultural spray vehicles, 30 to 50% of the spray boom may not be visible to the operator.

On some larger sprayers such as those typically used by custom applicators in the Midwest, Central Canada and the Plains, video cameras are sometimes mounted on the rear of the sprayer so that the operator can monitor, at least in theory, the spray boom out of his or her line of sight. However, at high travel speeds, the operator's attention is fully devoted to driving instead of monitoring the spray boom in the rear, either in the line of direct sight or shown on the video monitor. Due to poor overall visibility from the operator's station and the infrequency of stops and refillings, there is a need for individual nozzle monitoring to confirm that no clogging, pinched hoses, damaged nozzles or other problems may be present or developing on the spray boom.

A similar problem exists on shielded or shrouded sprayers sometimes used in the North American Plains and in urban and landscape applications. In farming areas in extreme southern and northern latitudes and in high value specialty crops, often grown in coastal areas, the agronomic time window for pesticide applications can be critically short and often occurs during windy periods. Shielded sprayers are often used in these conditions. Similarly, sprayers used in golf course, landscape and other urban conditions commonly use shrouds, curtains or shields to reduce spray drift and as a concession to public relations. However, the shields prevent the operator from visually inspecting the nozzle spray patterns to confirm proper operation. Improperly operating nozzles are not easily detected. Commercial systems for agricultural use often address this problem by routing individual liquid lines to each nozzle through a small rotameter (ball in tube) flow monitor that is mounted in the operator's line of sight. Such rotameters require cumbersome plumbing for each nozzle and require the operator visually monitor the bank of tubes.

One drawback of relying on visual inspection (either direct line of sight or video) or simple flow measurement (ball in tube) is that such methods do not assure proper nozzle operation. Nozzles can be partially clogged or have an obstruction in the flow path and appear to be operating correctly even if the flow rate is significantly affected. Conversely, the nozzle pattern and spray droplet size can be severely distorted by an obstruction or damage, yet the flow rate remains close to the original value.

Electronic spray rate control systems and application monitors typically use a single flowmeter and/or pressure transducer for feedback of the flow conditions on the entire spray boom. In systems with many nozzles, such as a 50-60 nozzle boom, failure of 1 or 2 nozzles would be unlikely to raise an alarm since the overall effect is only 2% of the expected flow rate; the system would compensate by maintaining the correct overall flow to the entire boom. So, if one nozzle became completely clogged, the system would simply increase the spray pressure and force an additional 2% flow through the remaining nozzles operating properly. Even with the electronic control or monitor system, the driver would likely remain unaware of the failure.

Additionally, when individual nozzle control is implemented, the need for individual nozzle monitoring increases. Pulse width modulation systems have electrical and mechanical components on each nozzle. Multiple nozzle manifolds have multiple tips and actuators at each boom location. The opportunity for failure is increased over that of a simple nozzle. These systems require not only flow monitoring but also monitoring of the control actuators used for flow or droplet size modulation. Moreover, individual nozzle control implies that individual nozzle feedback is required for closed loop operation.

Future systems may incorporate individual nozzle injection of multiple agrochemicals or adjuvants, individual control of droplet size spectra, droplet velocity or spray distribution. In each case, the need for monitoring and actuation on a single-nozzle or single manifold basis increases.

Thus, a need currently exists for a system and process for monitoring spray nozzle operation. Such a system and process is well suited for use in the agricultural field. It should be understood, however, that similar needs also exist in other fields. For example, on irrigation systems, there may be many small nozzles, often obscured from view or in areas that are difficult to access. Failure of a nozzle might not be detected until drought damage to a plant had occurred and symptoms were visible. Likewise, in industrial spray driers, malfunction of a nozzle might not be detected until significant amounts of product had been damaged. In spray humidification or cooling systems, nozzle failures might not be detected until excessive heating or drying had occurred. Specifically, a system that monitors nozzle operation may find wide applicability in any system, whether commercial, industrial or residential, that utilizes spray nozzles.

BRIEF DESCRIPTION

In one aspect, a drive circuit for a solenoid valve having a coil and a poppet configured to translate within the coil is provided. The drive circuit includes a drive switch operable to de-energize the coil to translate the poppet toward a closed position, a sensor configured to detect the poppet translating within the solenoid valve, and a drive circuit configured to energize and de-energize the coil of the solenoid valve to translate the poppet of the solenoid valve between an open position and a closed position. The drive circuit includes a controller configured to receive a closure signal from the sensor, determine a closing time of the solenoid valve based on the closure signal, determine a time delay between de-energizing the coil and the determined closing time, and determine a fluid flow value of fluid flowing through the solenoid valve based on the determined time delay.

In another aspect, a fluid application system includes a fluid dispensing outlet and a solenoid valve coupled in fluid communication with the fluid dispensing outlet and configured to regulate flow of fluid through the fluid dispensing outlet. The solenoid valve includes a coil and a poppet. The fluid application system also includes a drive circuit configured to energize and de-energize the coil of the solenoid valve to translate the poppet of the solenoid valve between an open position and a closed position. The drive circuit includes a controller configured to determine a closing time of the solenoid valve, determine a time delay between de-energizing the coil and the determined closing time of the solenoid valve, and determine a fluid flow value of fluid flowing through the solenoid valve based on the time delay.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

Corresponding reference characters indicate corresponding parts throughout the several views of the drawings.

DETAILED DESCRIPTION

Figure 1:
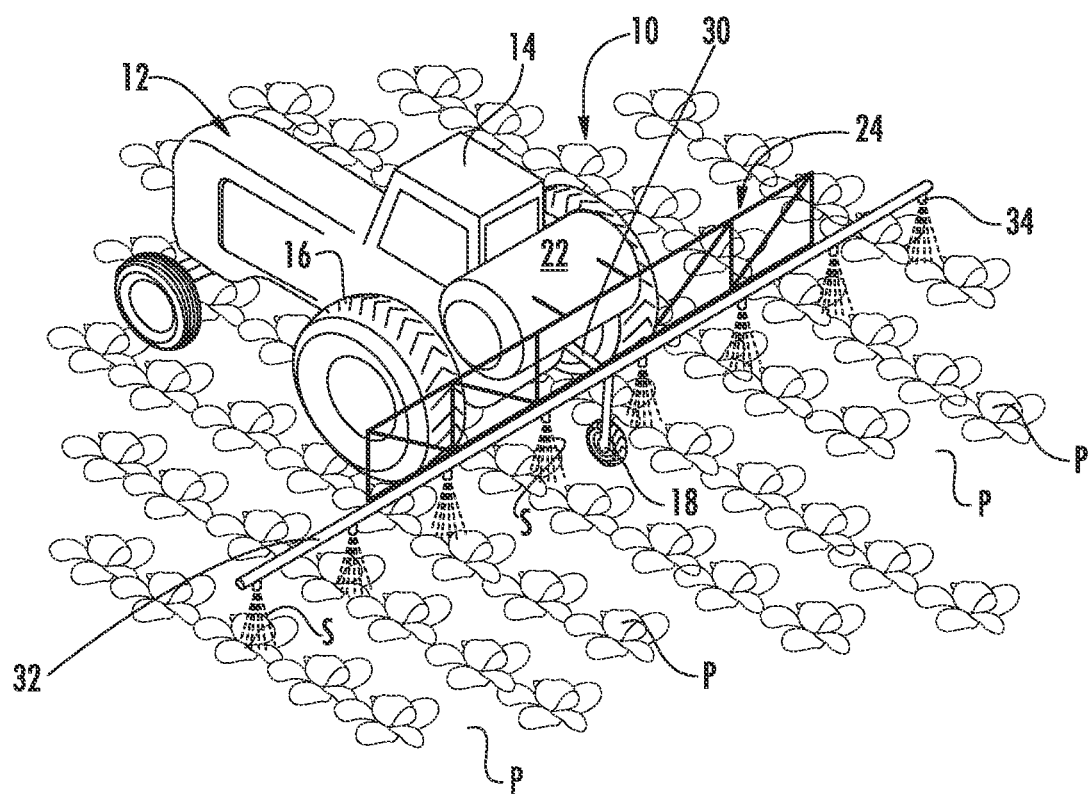
FIG. 1 is a perspective view of one embodiment of an agricultural spray system.

Referring now to the Figures, FIG. 1 is a perspective view of one embodiment of a spray system, indicated generally at 10, operatively connected to a work vehicle 12. As shown, work vehicle 12 includes a cab 14 and a plurality of wheels 16. Work vehicle 12 may in certain embodiments be an agricultural tractor having any suitable configuration. However, it should be appreciated that in other embodiments, any other suitable aero or ground means may be provided for moving spray system 10. For example, in other embodiments, work vehicle 12 may not include a cab, and instead may have any suitable operator station. Further, in some embodiments, work vehicle 12 and/or spray system 10 may include a global positioning system (e.g., a GPS receiver) for automated control of work vehicle 12 and/or spray system 10. In some embodiments, the global positioning system is used to monitor a travel speed of vehicle 12 and/or spray system 10, and/or to monitor a position of work vehicle 12 and/or spray system 10.

In the example embodiment, spray system 10 includes at least one boom wheel 18 for engaging a section of ground with a crop, produce, product or the like (generally, P), a tank or reservoir 22, and a spray boom 24. Spray boom 24 includes a plurality of nozzle assemblies 34 attached thereto and in fluid communication with tank 22. Tank 22 holds a product S, such as a liquid, a mixture of liquid and powder, or other product. Product S may be a quantity of water or an agrochemical such as a fertilizer or a pesticide, and may be sprayed from nozzle assemblies 34 onto, for example, a crop or produce or ground P itself, as shown in FIG. 1 and described in greater detail below. It should be appreciated, however, that in other embodiments, system 10 may have any other suitable configuration. For example, in other embodiments, system 10 may not include boom wheel 18 or may alternatively include any suitable number of boom wheels 18. Further, while work vehicle 12 is depicted as towing spray system 10 in the example embodiment, it should be appreciated that, in other embodiments, work vehicle 12 may transport spray system 10 in any suitable manner that enables spray system 10 to function as described herein.

The quantity of product S held in tank 22 generally flows through a conduit to nozzle assemblies 34. More specifically, in the embodiment illustrated in FIG. 1, product S flows from tank 22, through a pipe 30 to a boom pipe 32, and from boom pipe 32 to nozzle assemblies 34. In certain embodiments, nozzle assemblies 34 comprise direct acting solenoid valve equipped nozzles (see, e.g., FIGS. 2-4) and system 10 may include a pump, transducers to measure fluid pressure and fluid flow, sectional regulating valves, and a pressure and/or flow controller (not shown in FIG. 1). If included, the pump may be positioned downstream from tank 22, upstream from boom pipe 32 and nozzle assemblies 34, and in operative communication with the controller. The pump may be a pulse width modulation controlled pump configured to provide a desired amount of product S flow through system 10. The pressure or flow controller may be configured to vary certain operating parameters of the pump, such as the pump's pulse frequency and/or duty cycle, to obtain a desired product flow rate through system 10.

Referring still to FIG. 1, product S flows through nozzle assemblies 34 and may be applied to ground P in various ways. For example, product S may flow from nozzle assemblies 34 in a pulsed pattern. It should be appreciated that terms "pipe" and "conduit," as used herein, may mean any type of conduit or tube made of any suitable material such as metal or plastic, and moreover that any other suitable ground application devices can be added to provide varying effects of placement of product S on top or below a soil surface of ground P, such as via pipes, knives, coulters, and the like.

Figure 2:
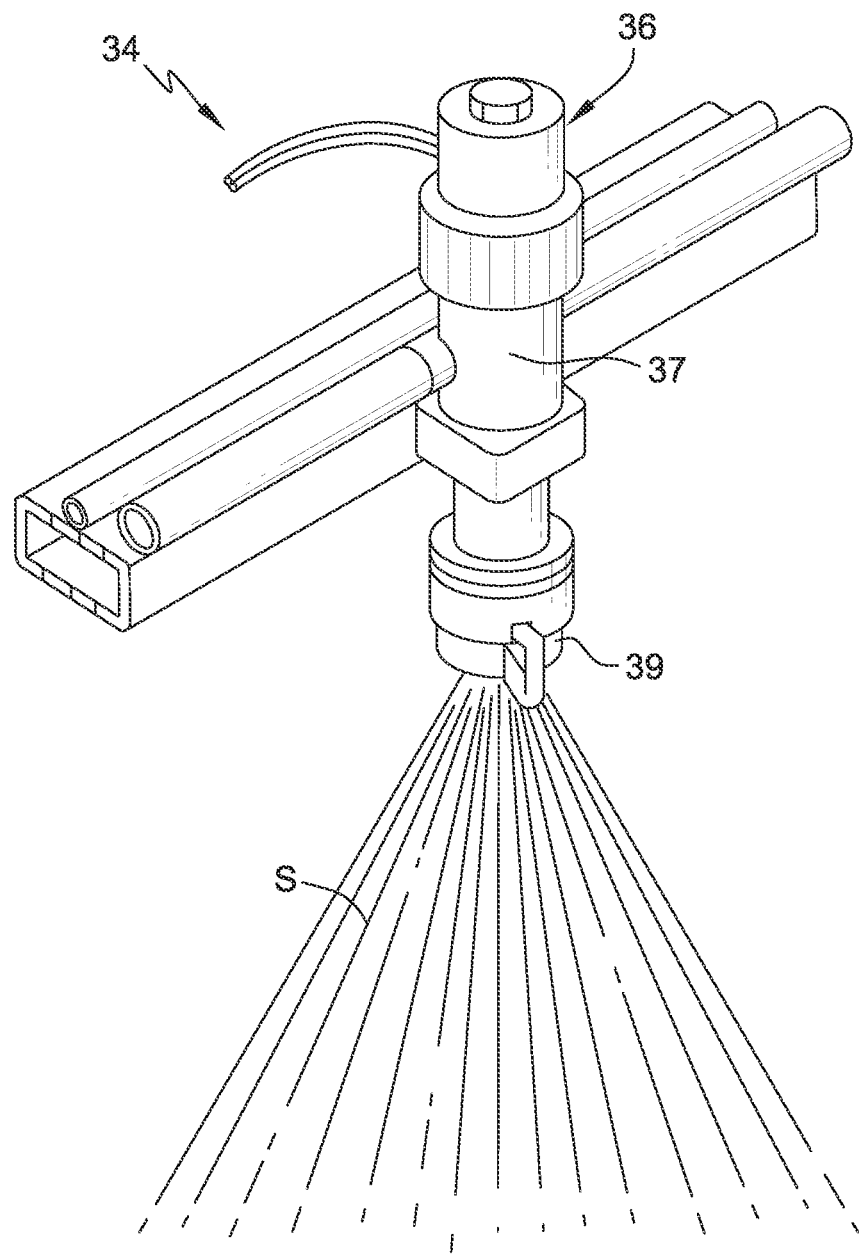
FIG. 2 is a perspective view of one embodiment of a nozzle assembly suitable for use with the agricultural spray system of FIG. 1.

FIG. 2 is a perspective view of one embodiment of a nozzle assembly 34 suitable for use with spray system 10 of FIG. 1. As shown in FIG. 2, nozzle assembly 34 generally includes a valve assembly 36, a nozzle body 37 configured to receive product S flowing through boom pipe 32 and a spray nozzle 39 mounted to and/or formed integrally with nozzle body 37 for expelling product S from nozzle assembly 34 onto crops, product and/or ground P.

Figure 3:
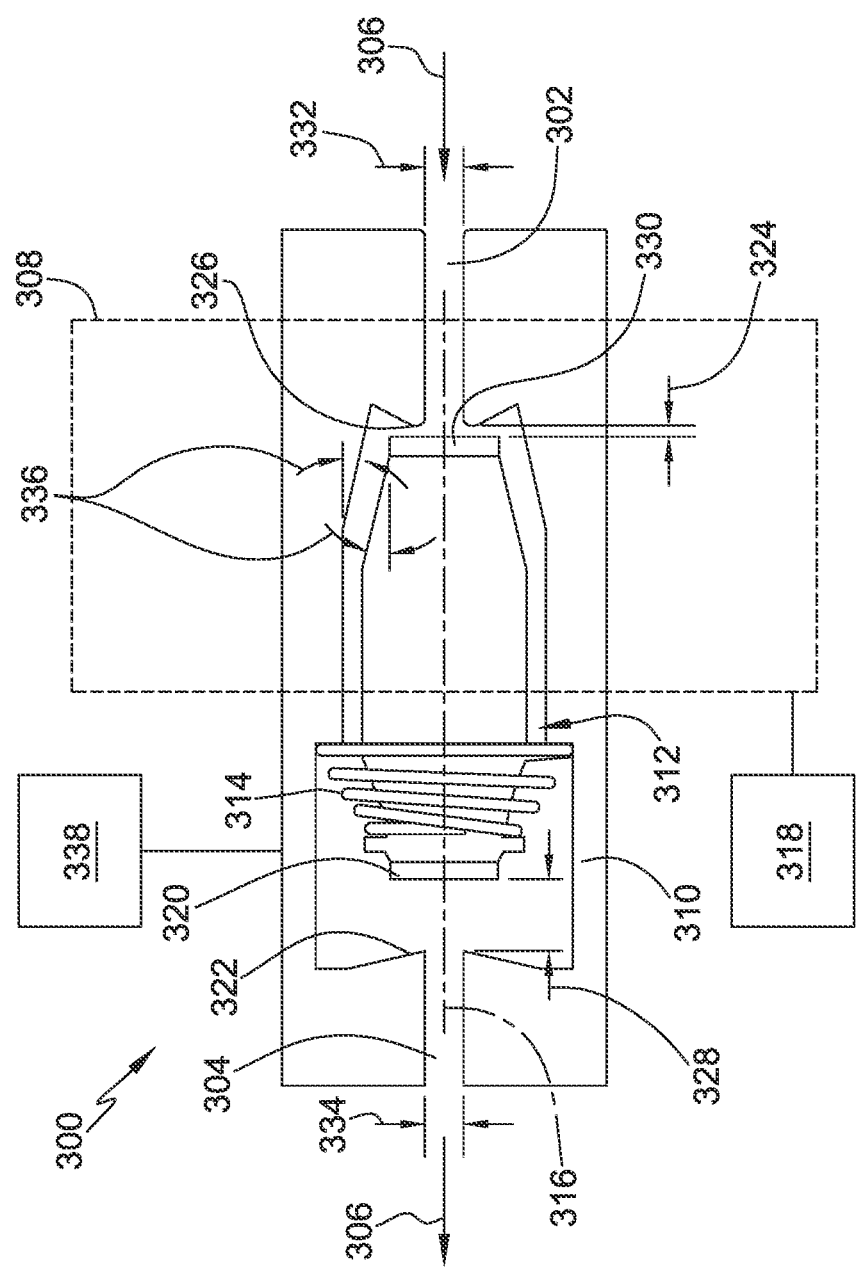
FIG. 3 is a sectional view of a portion of a valve assembly suitable for use in the nozzle assembly shown in FIG. 2.
Figure 4:
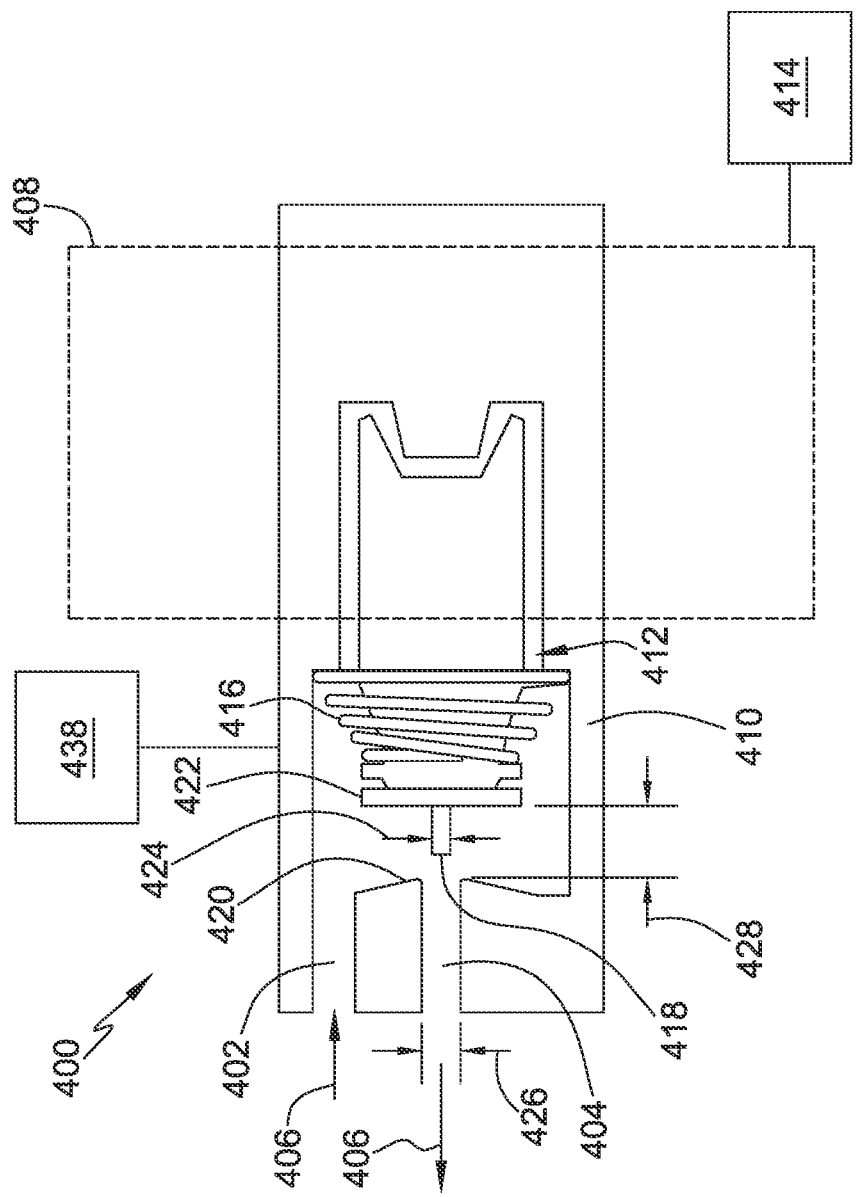
FIG. 4 is a sectional view of a portion of another valve assembly suitable for use in the nozzle assembly of FIG. 2.

In some embodiments, valve assembly 36 is a solenoid valve (see, e.g., FIGS. 3 and 4). Moreover, in some embodiments, valve assembly 36 may be configured to be mounted to and/or integrated with a portion of spray nozzle 39. In some embodiments, for example, valve assembly 36 may be mounted to the exterior of nozzle body 37, such as by being secured to nozzle body 37 through the nozzle's check valve port. Alternatively, valve assembly 36 may be integrated within a portion of nozzle body 37.

FIG. 3 is a simplified, cross-sectional view of one embodiment of an electric solenoid valve 300 suitable for use in nozzle assembly 34 shown in FIG. 2. In general, valve 300 includes an inlet 302 and an outlet 304 for receiving and expelling fluid 306 from valve 300. Valve 300 also includes a solenoid coil 308 (outlined by the dashed lines) located on and/or around a guide 310. For instance, in one embodiment, solenoid coil 308 is wrapped around guide 310. Additionally, an actuator or poppet 312 is movably disposed within guide 310. In particular, poppet 312 may be configured to be linearly displaced within guide 310 relative to inlet 302 and/or outlet 304 of valve 300. Moreover, as shown, valve 300 includes a spring 314 coupled between guide 310 and poppet 312 for applying a force against poppet 312 in the direction of outlet 304. It should be appreciated that valve 300 may also include a valve body or other outer covering (not shown) disposed around coil 308.

As shown in the illustrated embodiment, valve 300 is configured as an in-line valve. Thus, fluid 306 may enter and exit valve 300 through inlet 302 and outlet 304, respectively, along a common axis 316. In other words, the inlet 302 and outlet 304 may generally be aligned along axis 316. Additionally, as shown in FIG. 3, in one embodiment, inlet 302 and outlet 304 may be concentrically aligned with both one another and the positioning of poppet 312 within guide 310. As such, poppet 312 may be configured to be linearly displaced within guide 310 along axis 316 such that fluid 306 may generally be directed through valve 300 along axis 316 as the movement of poppet 312.

In addition, solenoid coil 308 may be coupled to a controller 318 configured to regulate or control the current provided to coil 308. Controller 318 may be enclosed within valve assembly 300, may be enclosed within nozzle assembly 34, as shown in FIG. 2, or may exist some distance away from nozzle assembly 34. Controller 318 may generally comprise any suitable computer and/or other processing unit, including any suitable combination of computers, processing units and/or the like that may be communicatively coupled to one another (e.g., controller 318 may form all or part of a controller network). Thus, controller 318 may include one or more processor(s) and associated memory device(s) configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of controller 318 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure controller 318 to perform various functions including, but not limited to, controlling the current supplied to solenoid coil 308, monitoring inlet and/or outlet pressures of the disclosed valve(s), monitoring poppet operation of the disclosed valves, receiving operator inputs, performing the calculations, algorithms and/or methods described herein and various other suitable computer-implemented functions.

Figure 5:
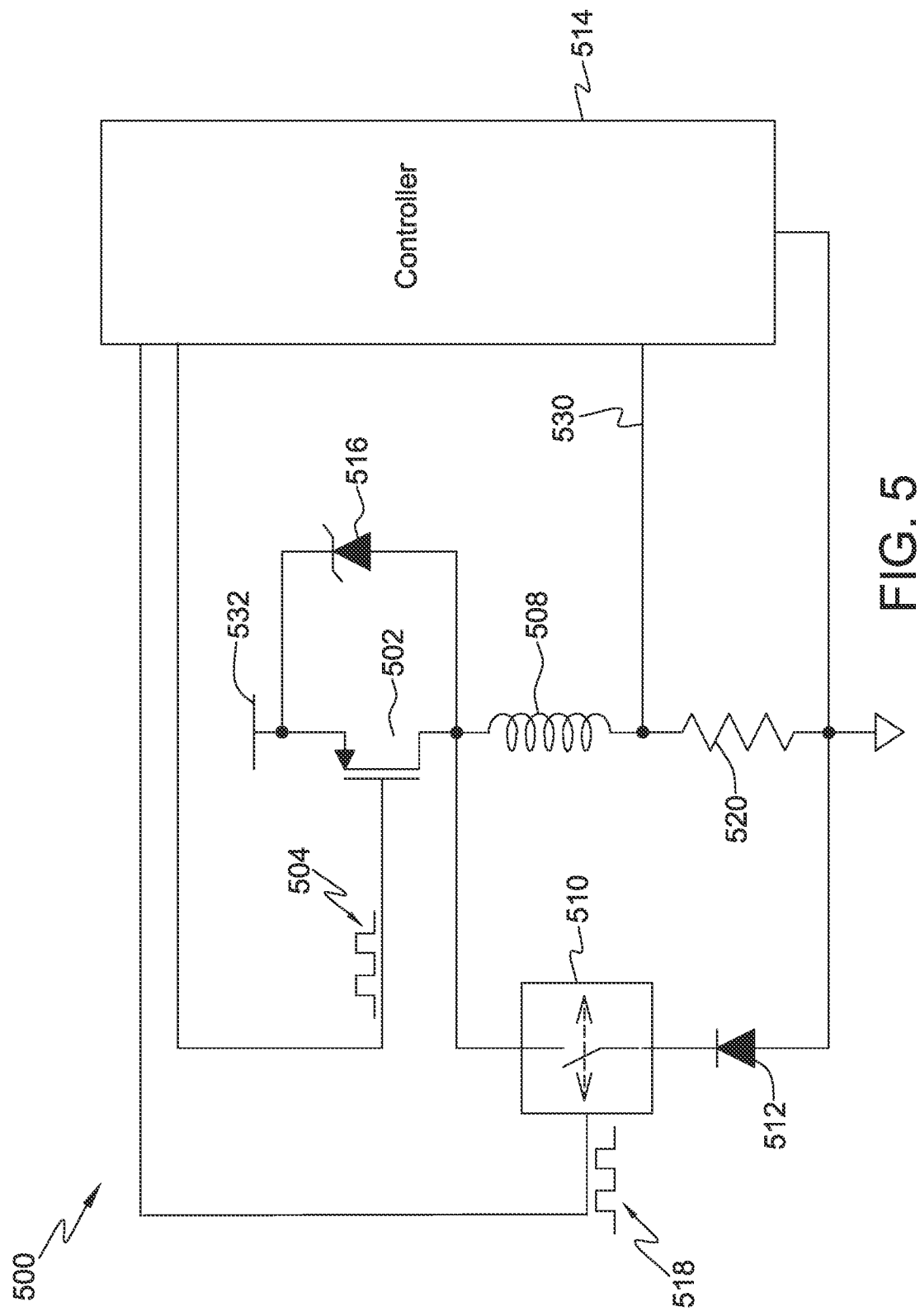
FIG. 5 is a schematic diagram of one embodiment of a drive circuit for controlling the valve assemblies shown in FIG. 3 and FIG. 4.

Coil 308 may be configured to receive a controlled electric current or electric signal from controller 318 such that poppet 312 may move within guide 310 relative to inlet 302 and/or outlet 304. For example, in one embodiment, controller 318 includes a square wave generator, a coil drive circuit as shown in FIG. 5, or any other suitable device that is configured to apply a regulated current to coil 308, thereby creating a magnetic field which biases (by attraction or repulsion) poppet 312 toward inlet 302. As a result, poppet 312 may be moved to a proper throttling position for controlling the pressure drop across valve 300. Additionally, the attraction between coil 308 and poppet 312 may also allow poppet 312 to be pulsated or continuously cyclically repositioned, thereby providing for control of the average flow rate through valve 300.

In several embodiments, a modulated square wave may drive valve 300 to control the pressure and flow rate. The duty cycle of a high-frequency modulation (e.g., at a frequency greater than about 200 Hz) may be used to regulate coil current and partially open valve 300 by moving poppet 312 to a particular throttling position, thereby providing a means for manipulating the outlet pressure of fluid 306. Additionally, the low-frequency pulse duty cycle (e.g., at a frequency of less than 30 Hz) may be used to meter the average flow rate by enabling/disabling the temporally-averaged flow rate that results from the outlet pressure.

In certain embodiments, the poppet position may be regulated by the forces acting on poppet 312, with a steady throttling position resulting from equilibrium of the forces. For example, in the illustrated embodiment, forces from spring 314, fluid 306 and coil 308 may act on poppet 312 simultaneously. Specifically, the forces from spring 314 and fluid 306, tend to bias poppet 312 in the direction of outlet 304 while the force from coil 308 tends to bias poppet 312 in the direction of inlet 302.

Thus, when valve 300 is unpowered (i.e., when a voltage is not applied across coil 308), spring 314 may force poppet 312 towards outlet 304 such that the increased system pressure has a tendency to force valve 300 into a sealed or closed position. In such an embodiment, poppet 312 may include a rubber disk or any other suitable sealing member 320 configured to press against an outlet seat 322 of outlet 304 to create a leak-free seal on valve 300 when valve 300 is in the closed position. Additionally, when valve 300 is powered (i.e., when a voltage is applied to coil 308), poppet 312 may be attracted by coil 308 toward inlet 302 such that poppet 312 is moved to the throttling position. Specifically, the current supplied to coil 308 may be controlled such that the force acting on poppet 312 by coil 308 is sufficient to position poppet 312 a predetermined distance 324 from an inlet seat 326 of inlet 302, thereby allowing the pressure across valve 300 to be throttled.

The particular distance 324 from inlet seat 326 (also referred to herein as the "poppet displacement") at which poppet 312 is positioned may generally vary depending on the desired outlet pressure for valve 300. However, given the configuration of the disclosed valve 300, distance 324 may always be less than total stroke of poppet 312 (defined as the summation of distance 324 and a distance 328 between poppet 312 and outlet seat 322). In several embodiments, distance 324 may be less than 60% of the total stroke of poppet 312, such as less than 50% of the total stroke of poppet 312 or less than 40% of the total stroke of poppet 312.

In several embodiments, when valve 300 is being pulsed, the movement of poppet 312 may be cycled between the throttling position and a sealed position, wherein poppet 312 is sealed against inlet 302. Thus, as shown in FIG. 3, poppet 312 may also include a rubber disk or other suitable sealing member 330 that is configured to be pressed against inlet seat 326 of inlet 302 so as to create a leak-free seal when valve 300 is in the sealed position. In such an embodiment, in order to transition valve 300 from the closed position (wherein poppet 312 is sealed against outlet 304) to the sealed position (wherein the poppet 312 is sealed against inlet 302), the solenoid may be initially turned on with a 100% high frequency duty cycle so as to move poppet 312 from outlet 304 to inlet 302 as quickly as possible. Subsequently, the current supplied to coil 308 may be controlled such that poppet 312 may be cyclically pulsed between the sealed position and the throttling position. However, in alternative embodiments, valve 300 may be configured to be pulsed between the closed position (wherein poppet 312 is sealed against outlet 304) and the throttling position.

The sizes of inlet 302 and outlet 304 (e.g., diameter 332 and diameter 334, respectively), as well as the geometry and/or configuration of poppet 312 and guide 310, may be chosen such that the force acting on poppet 312 from coil 308 may overcome the fluid forces and spring forces for every throttling position within the total stroke of valve 300 when the coil is fully powered. Similarly, in one embodiment, spring 314 may be sized such that the spring force corresponds to the minimal amount of force required to maintain a drip-free valve 300 when valve 300 is unpowered.

In several embodiments, poppet 312 and/or guide 310 may include a tapered portion at and/or adjacent to inlet 302. Specifically, as shown in FIG. 3, both poppet 312 and guide 310 include a tapered portion defining a taper angle 336 at and/or adjacent to inlet 302. In several embodiments, taper angle(s) 336 may range from about 25 degrees to about 45 degrees, such as from about 25 degrees to about 40 degrees or from about 27 to about 35 degrees and all other subranges there between. However it is foreseeable that, in alternative embodiments, taper angle(s) 336 may be less than about 25 degrees or greater than about 45 degrees.

As indicated above, coil 308 may be driven with a complex pulsed voltage waveform. A "pulse" may correspond to a duration (e.g., a 100 millisecond cycle) in which a low frequency duty cycle value sets the amount of on/off time. The "on" time may correspond to a "coil discharging (or charging) period" in which the drive voltage is turned off (or on) continuously and a "modulated period" in which the voltage is turned on and off at a high frequency (e.g., at a frequency of greater than 200 Hz). The duration of the coil discharging (or charging) period may be determined by the amount of time for the coil current to reach the desired value. The coil current may be continuously measured and compared to a threshold in order to trigger switching of the drive voltage to a modulated signal.

In certain embodiments, movement of poppet 312 may be sensed by a poppet measurement device 338. For example, in certain embodiments, measurement device 338 may be an accelerometer, a hall-effect sensor, a coil current sensor, or other suitable device capable of sensing when a poppet moves from an open position to a closed position. The measurement device 338 may be communicatively coupled to controller 318, and may be disposed within valve assembly 300, within nozzle assembly 34, as shown in FIG. 2, or some distance away from nozzle assembly 34.

Referring now to FIG. 4, a simplified, cross-sectional view of another embodiment of an electric solenoid valve 400 suitable for use in nozzle assembly 34 shown in FIG. 2 is illustrated. In general, valve 400 may be configured similarly to valve 300 described above with reference to FIG. 3 and, thus, may include many or all of the same components. For example, valve 400 may include an inlet 402 and an outlet 404 for receiving and expelling a fluid 406 from valve 400. Additionally, valve 400 may include a solenoid coil 408 (outlined by dashed lines) located on and/or around a guide 410 and a poppet 412 movably disposed within guide 410. Solenoid coil 408 may be configured to receive a controlled electric current or electric signal from a controller 414 such that poppet 412 may be moved within guide 410 relative to outlet 404. Controller 414 may have the same configuration as controller 318 described above with reference to FIG. 3, and may be enclosed within the valve assembly 400, may be enclosed within the nozzle assembly 34 as shown in FIG. 2, or may exist some distance away from nozzle assembly 34. Valve 400 may also include a spring 416 coupled between guide 410 and poppet 412 for applying a force against the poppet 412 in the direction of outlet 404. It should be appreciated that valve 400 may also include a valve body or other outer covering (not shown) disposed around solenoid coil 408.

In some embodiments, valve 400 may also include a poppet measurement device 438 capable of sensing when a poppet moves from an open position to a closed position. For example, in certain embodiments, measurement device 438 may be an accelerometer, a hall-effect sensor, a coil current sensor, or other suitable device capable of sensing when a poppet moves from an open position to a closed position. The measurement device 438 may be communicatively coupled to controller 414, and may be disposed within valve assembly 400, within nozzle assembly 34, as shown in FIG. 2, or some distance away from nozzle assembly 34.

In contrast to the in-line valve 300 described above, valve 400, illustrated in FIG. 4, is configured as a counter flow valve. Thus, fluid 406 may be configured to enter and exit valve 400 along different axes. For example, as shown, outlet 404 may generally be aligned with the axis of movement of poppet 412 and inlet 402 may be offset from such axis, such as by being disposed above outlet 404.

Additionally, in one embodiment, poppet 412 may be configured to include a projection 418 (e.g., a section of poppet 412 being reduced in size) extending outwardly in the direction of outlet 404. For example, as shown in FIG. 4, projection 418 may extend outwardly from the portion of poppet 412 configured to be sealed against an outlet seat 420 of outlet 404 (e.g., a rubber disk or any other suitable sealing member 422).

As described in U.S. patent application Ser. No. 13/410,589, the entirety of which is hereby incorporated by reference, projection 418 may be configured to be received within a portion of outlet 404 such that a partial opening of valve 400 generates a first constant flow coefficient, and fully opening valve 400 generates a second constant flow coefficient greater than the first constant flow coefficient. In alternative embodiments, the illustrated valve 400 may not include projection 418 shown in FIG. 4.

Similar to valve 300 described above, the partially open state may be achieved by controlling the forces acting on poppet 412. For example, a regulated amount of voltage may be applied to solenoid coil 408 (generating a regulated amount of coil current through solenoid coil 408) such that the forces acting on poppet 412 by solenoid coil 408, spring 416 and fluid 406 are in an equilibrium state when poppet 412 is located at the desired throttling position. In such an embodiment, a resulting distance 428 between sealing member 422 and outlet seat 420 may be chosen to position the volume of the outlet occupied by projection 418 to throttle the pressure across valve 400.

Generally, the disclosed solenoid valves 300 and 400 may be utilized to control the instantaneous pressure drop across and the cyclic duration of flow through any suitable device. However, in several embodiments of the present disclosure, the solenoid valves 300 and 400 may be used to control the instantaneous pressure drop across and the cyclic duration of flow through an agricultural spray nozzle. In such embodiments, the disclosed solenoid valves 300 and 400 may be configured as part of a nozzle assembly for use with various agricultural spraying systems.

FIG. 5 is a schematic diagram of one embodiment of a drive circuit 500 for controlling valves 300 and 400 shown in FIG. 3 and FIG. 4, or may form all or part of the disclosed controllers 318 or 414. Drive circuit 500 may further include or interface with a poppet measurement device, such as poppet measurement devices 338 and 438, shown in FIGS. 3 and 4, respectively. In general, circuit 500 may be configured to generate a waveform for a solenoid valve and may also be configured to measure the solenoid coil current. In one embodiment, circuit 500 includes a field-effect transistor (FET) 502 controlled by a control signal or waveform 504 to connect/disconnect a supply voltage 532 to a solenoid coil 508, thereby energizing or de-energizing solenoid coil 508. Solenoid coil 508 may be, for example, solenoid coil 308 or solenoid coil 408 of valves 300 and 400 shown in FIGS. 3 and 4. In addition, drive circuit 500 includes a current sense resistor 520 configured to generate a sense voltage 530 directly indicating the current through current sense resistor 520 and solenoid coil 508.

While solenoid coil 508 is energized to open the solenoid valve, a fly-back switch 510 enables a fly-back diode 512 to allow current in solenoid coil 508 to remain nearly constant during a high frequency modulation of control signal 504. Fly-back switch 510 may disable fly-back diode 512 at the beginning or end of a low-frequency pulse to force a more rapid coil current change. Fly-back switch 510 may be implemented as, for example, a field-effect transistor (FET), a silicon controlled rectifier (SCR), relay, or any other suitable switch.

FET 502 disconnects supply voltage 532 to de-energize solenoid coil 508 and to close the solenoid valve. During closing, current through solenoid coil 508 is dissipated to allow a poppet of the solenoid valve to translate toward the closed position. Fly-back switch 510 disables fly-back diode 512 by opening the fly-back circuit when FET 502 disconnects supply voltage 532. Disabling fly-back diode 512 facilitates dissipating the current in solenoid coil 508 more quickly through a charge build up and resulting large potential across coil 508. In certain embodiments, FET 502 may be protected from the voltage induced by coil 508 with a transient voltage suppressor diode 516 having a clamping voltage suitable to protect FET 502.

As the current through solenoid coil 508 dissipates, the force exerted by solenoid coil 508 on the poppet decreases until the sum of forces acting on the poppet (e.g., spring forces, pressure differential forces, and magnetic force) cause the poppet to translate within solenoid coil 508 toward the closed position. As the poppet translates, an electromagnetic flux is generated and the poppet induces a coil current within solenoid coil 508. Immediately before or as the poppet begins to translate to the closed position, fly-back diode 512 can be re-enabled by closing fly-back switch 510, such that current may flow freely through the fly-back circuit and current sense resistor 520 detects the induced current, which manifests as sense voltage 530. In this manner, current sense resistor 520 may serve as poppet measurement device 338 or 438.

In certain embodiments, drive circuit 500 includes a processor 514. Processor 514 receives current sense voltage 530 and determines a peak coil current after solenoid coil 508 has been de-energized. The time between de-energizing solenoid coil 508 and the peak coil current represents the closing time delay for the solenoid valve. The time required for the solenoid valve to close is related to a fluid flow through the solenoid valve. Generally, the greater the fluid flow through the solenoid valve, the greater the pressure drop that develops across the poppet; and the less time required for the poppet to translate to the closed position. This relationship is governed by the following equation:

$$Q = C_{V1} \cdot \sqrt{\frac{\Delta p1}{SG}}, \qquad \text{Eq. 1}$$

where, Q is fluid flow through the solenoid valve, $C_{V1}$ is a flow coefficient of the valve metering orifice, $\Delta p1$ is a pressure drop across the valve metering orifice, and SG is the specific gravity of the fluid. Given the time at which the peak coil current occurs during closing of the solenoid valve and the relationship between peak coil current time and fluid flow, a fluid flow value representing fluid flow through the nozzle assembly may be determined.

In certain embodiments, processor 514 uses the time at which the peak coil current occurs to estimate flow through the solenoid valve based on experimental or statistical data gathered for close times for the solenoid valve. In one embodiment, for example, the flow is estimated by precomputed values in a look-up table. Additionally or alternatively, the flow may be computed using a "fit line" characterized by the experimental or statistical data, such as the data shown and described herein with reference to FIGS. 8 and 9.

In certain embodiments, processor 514 is further configured to compare the determined nozzle flow to a target nozzle flow for the nozzle assembly. For example, for a nozzle assembly having a given nozzle size and measured upstream pressure yielding a target nozzle flow of 1.0 gallons per minute, the determined nozzle flow is compared to the 1.0 gallons per minute. If the determined nozzle flow is less than 1.0 gallons per minute, the nozzle assembly may have a clog in the nozzle spray tip or elsewhere in the nozzle assembly that is impeding nozzle flow. Conversely, if the determined nozzle flow is greater than 1.0 gallons per minute, the nozzle assembly may be damaged and is not properly regulating flow through the nozzle assembly and nozzle spray tip. This may occur, for example, if the nozzle assembly strikes the ground or some other object and damages or shears off the nozzle spray tip.

In certain embodiments, processor 514 is further configured to generate control signal 504 to control FET 502. In certain embodiments, processor 514 is further configured to generate a second control signal 518 for controlling fly-back switch 510. Processor 514, for example, may be configured to close fly-back switch 510 to enable fly-back diode 512 for a period of time after solenoid coil 508 is de-energized. In such an embodiment, current would dissipate from solenoid coil 508 more slowly if fly-back switch 510 were closed and fly-back diode 512 were enabled. Opening fly-back switch 510 permits the poppet to translate sooner, thereby closing the valve more quickly. In one embodiment, fly-back switch 510 is open for a period of 4.8 milliseconds, which is sufficient for current to dissipate in solenoid coil 508 and to allow the poppet to begin translating toward the closed position. The period of time may vary per embodiment, depending on the particular solenoid valve, nozzle, spray system, or fluid, for example. Processor 514 is further configured to generate second control signal 518 to close fly-back switch 510.

Figure 6:
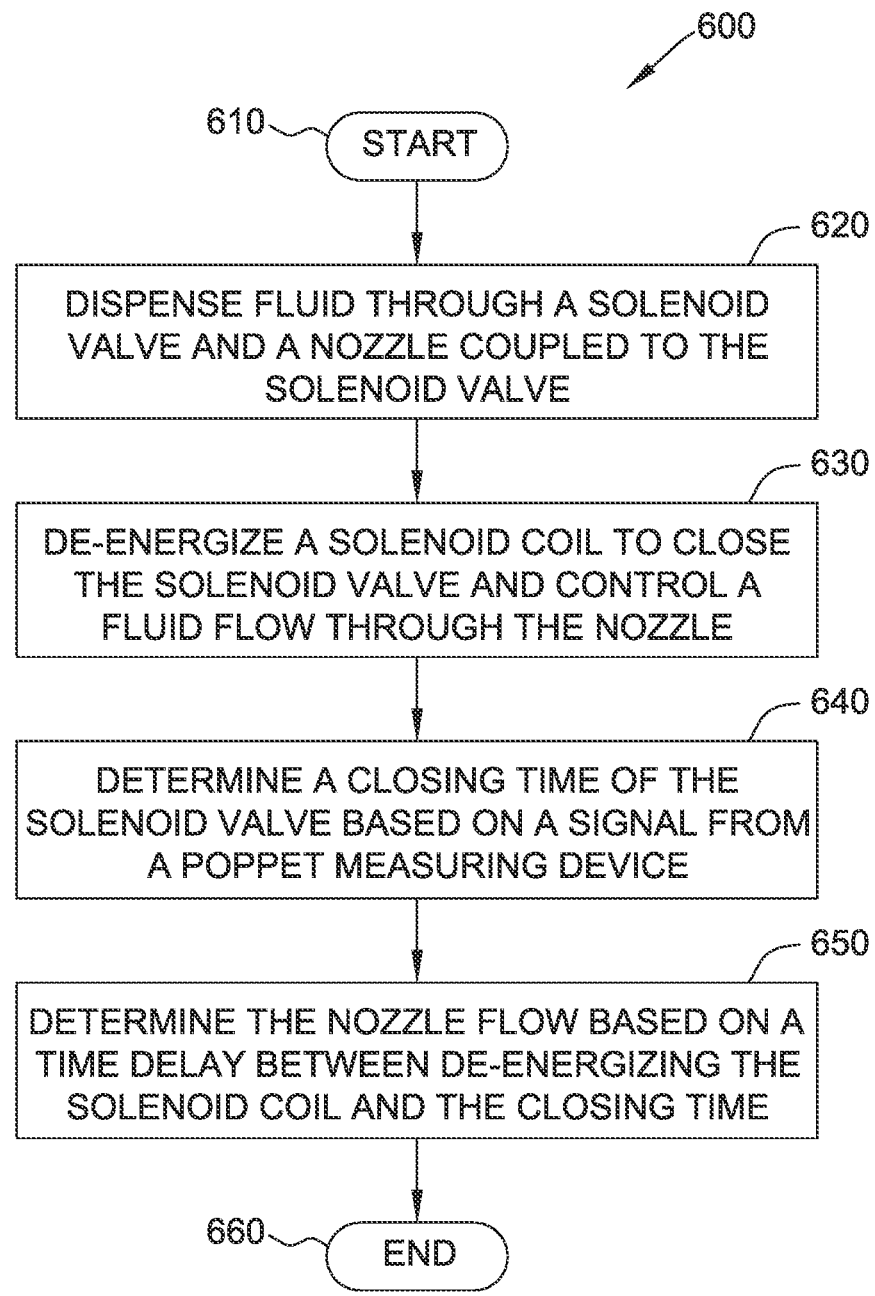
FIG. 6 is a flow diagram of one embodiment of a method of detecting nozzle flow in a spray system.

FIG. 6 is a flow diagram of one embodiment of a method 600 of detecting nozzle flow in a spray system, such as spray system 10 of FIG. 1. Method 600 begins at a start step 610. At a coil de-energizing step 620, a voltage across a solenoid coil, such as solenoid coils 308 and 408 of FIGS. 3 and 4, is turned off. Referring to FIGS. 4 and 6, solenoid valve 400 is in fluid communication with a nozzle, such as nozzle 39 of FIG. 2. The solenoid valve regulates flow of a fluid through the valve and toward the nozzle.

As the solenoid coil current dissipates, poppet 412 translates toward valve outlet 404 to a closed position. In step 630, poppet measurement device 438 senses the transition of poppet 412 to the closed position. Controller 414 detects the measurement device output at a step 640, and determines a time delay between de-energizing the solenoid coil and the measured poppet closure. Controller 414 then determines the nozzle flow based on the time delay between de-energizing the solenoid coil and the measured poppet closure at a nozzle flow determination step 650. In some embodiments, the time delay between de-energizing the solenoid coil and the measured poppet closure is determined based on a measured coil current, as described below with reference to FIG. 7. The method ends at an end step 660.

Figure 7:
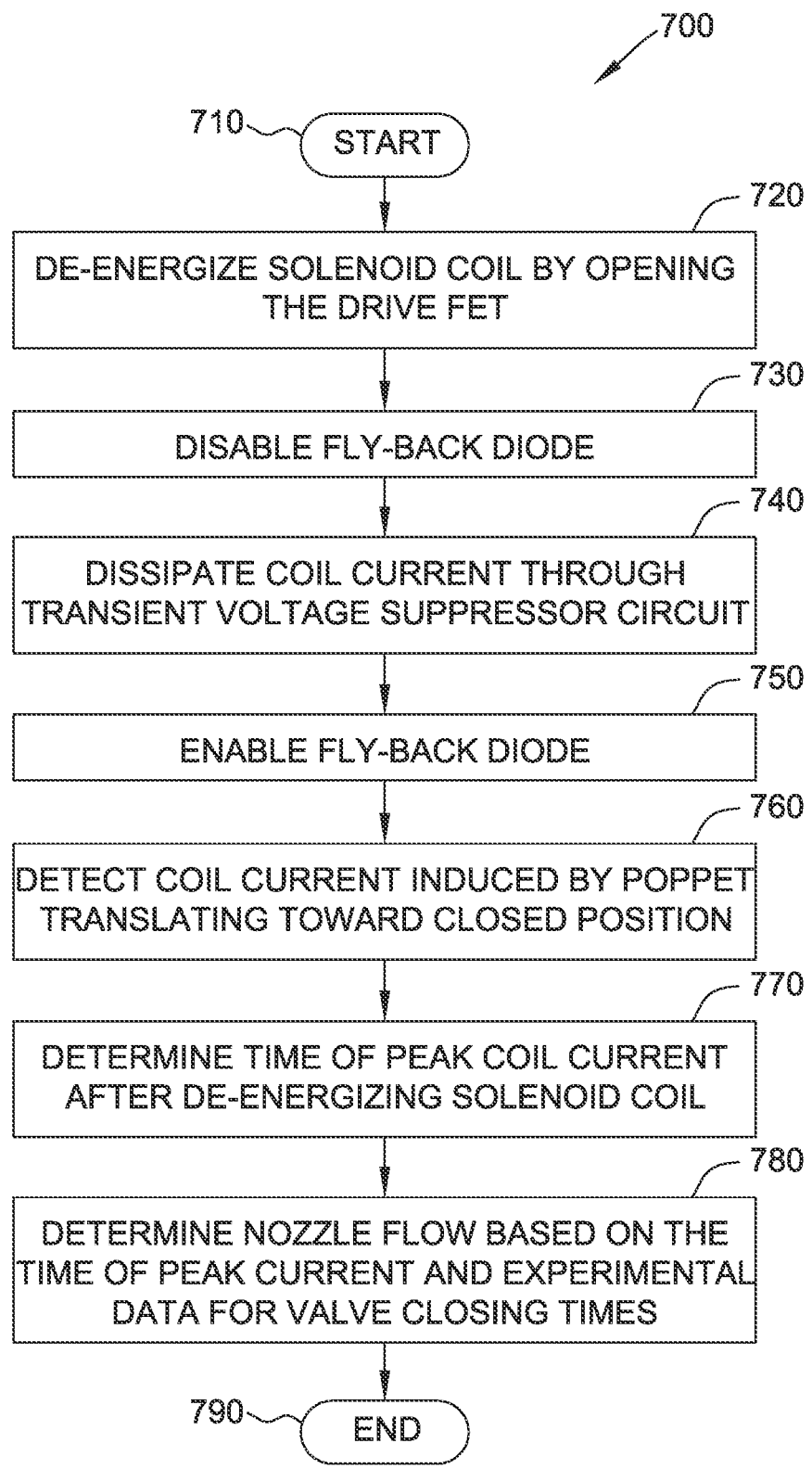
FIG. 7 is a flow diagram of another embodiment of a method of detecting nozzle flow in a spray system.

FIG. 7 is a flow diagram of another embodiment of a method 700 of detecting nozzle flow in a spray system, such as spray system 10 of FIG. 1. Method 700 begins at a start step 710. Referring to FIGS. 4, 5, and 7, at a de-energizing step 720, solenoid coil 408 is de-energized by opening FET 502. Fly-back diode 512 is disabled at a fly-back disabling step 730 by opening fly-back switch 510. Opening FET 502 and fly-back switch 510 facilitates dissipation of coil current at a dissipation step 740 through a charge build up across coil 408.

After a period of time, fly-back diode 512 is enabled at a fly-back enabling step 750 for the purpose of measuring coil current through current sense resistor 520. A coil current induced by the poppet translating through solenoid coil 408 toward the closed position is detected at a detection step 760. A controller, such as controllers 318 and 414 of FIGS. 3 and 4, receives the coil current measurement and determines, at a peak detection step 770, a time of a peak coil current after solenoid coil 408 is de-energized. The controller then uses the time delay of the valve closure to determine nozzle flow at a determination step 780.

Figure 8:
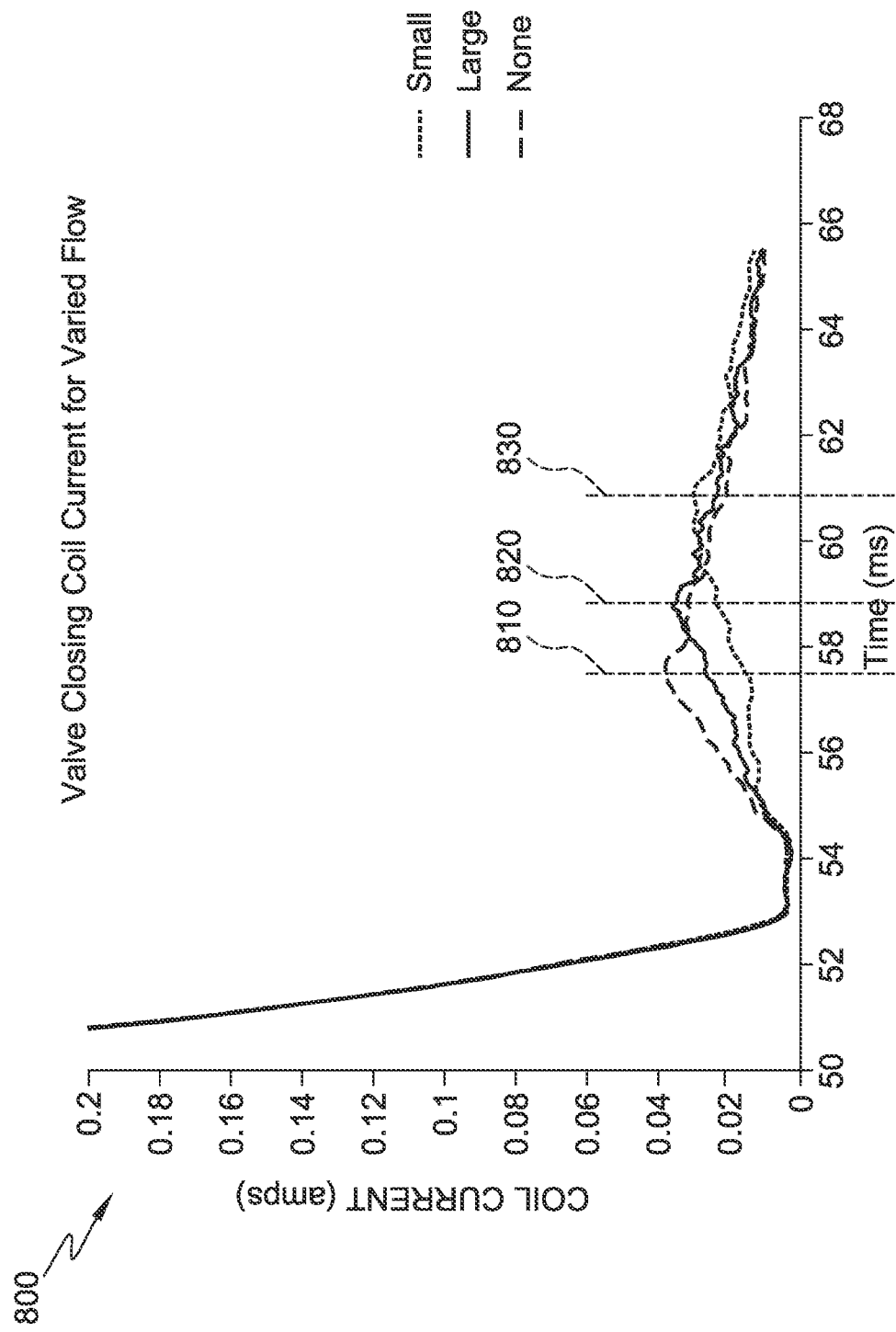
FIG. 8 is a plot showing times of peak coil current for variously sized nozzle assemblies.

FIG. 8 is a plot 800 showing times of peak coil current for variously sized nozzle assemblies, such as nozzle assembly 34 shown in FIG. 2. Plot 800 includes three different spray nozzles 39: a nozzle assembly without a spray tip attached, a nozzle assembly with a small nozzle spray tip that permits a low nozzle flow relative to the nozzle assembly without a spray tip, and a nozzle assembly with a large nozzle spray tip that permits a large nozzle flow relative to the small nozzle spray tip, but still more restricted nozzle flow relative to the nozzle assembly without a nozzle spray tip.

For each of the nozzle spray tips, closing of the solenoid valve for the nozzle assembly was initiated at a time of 50 milliseconds by the opening of the drive switch. The opening of the solenoid valve for the nozzle assembly was some time before 50 milliseconds, e.g., at a time of 0.0 milliseconds. When solenoid valve closure is initiated, the solenoid coil is de-energized, which is illustrated by each of the coil current plots for the three different nozzle assemblies falling initially toward zero amps. After approximately 4 milliseconds, each of the coil current plots begin to rise toward respective peaks, which corresponds with movement of the solenoid valve poppet toward the closed position. The precise time of the peak coil currents correlates to a fluid flow value.

The nozzle assembly without a nozzle spray tip permits the largest nozzle flow. The nozzle flow corresponds to an earlier valve closure indicated by a peak coil current at a time 810 that occurs at slightly less than 58 milliseconds, or slightly less than 8 milliseconds after the drive switch opened and initiated the de-energizing of the solenoid coil.

The nozzle assembly having the large nozzle spray tip permits less nozzle flow than the nozzle assembly without any nozzle spray tip. The nozzle flow corresponds to a valve closure indicated by a peak coil current at a time 820 that occurs at slightly less than 59 milliseconds.

The nozzle assembly having the small nozzle spray tip permits the least nozzle flow among the three. The nozzle flow corresponds to a valve closure indicated by a peak coil current at a time 830 that occurs at slightly less than 61 milliseconds.

Figure 9:
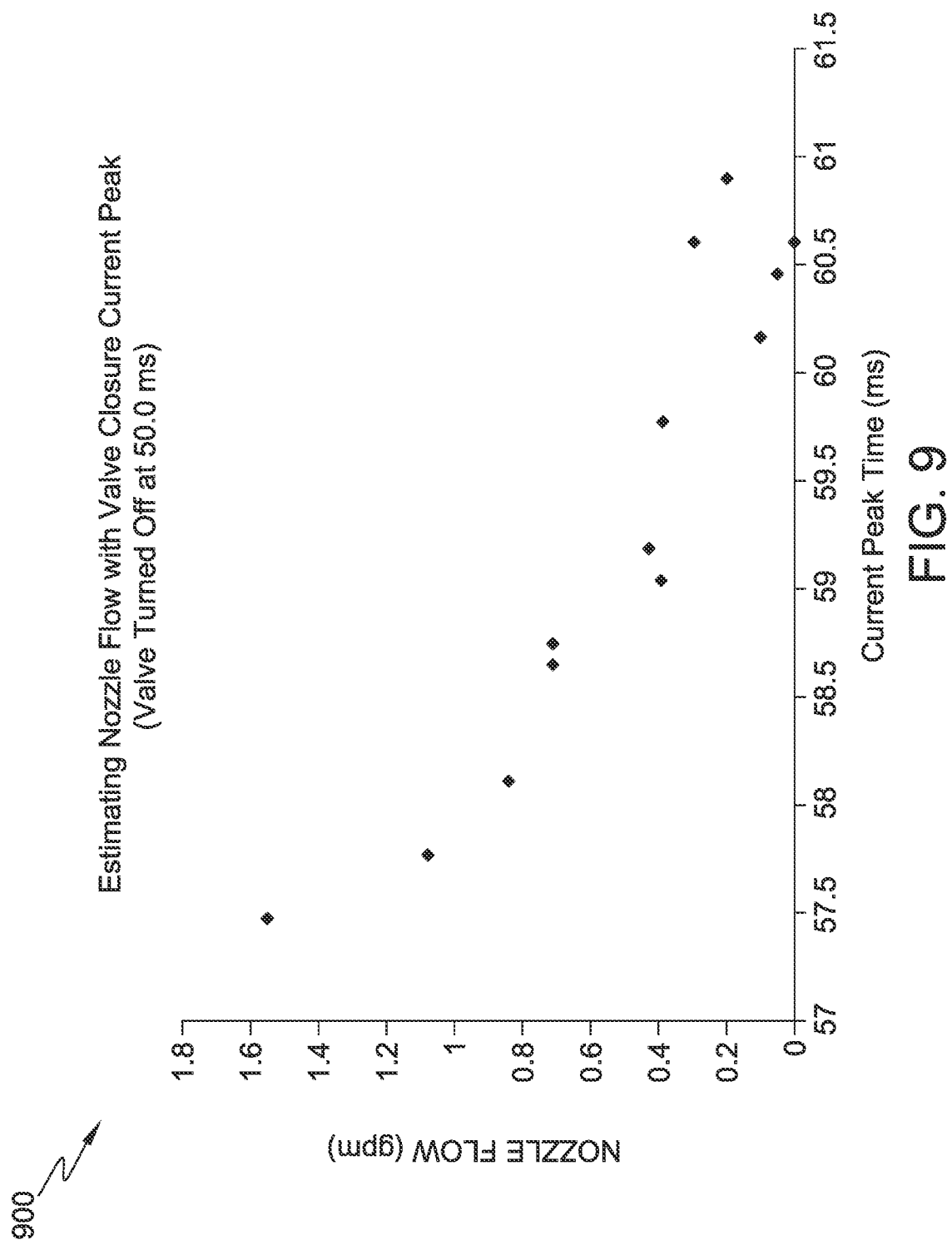
FIG. 9 is a plot showing nozzle flow versus time of peak coil current.

FIG. 9 is a plot 900 showing nozzle fluid flow in gallons per minute versus time of peak coil current in milliseconds. The data points on plot 900 represent various nozzle assemblies having variously sized nozzle spray tips. The solenoid valve for the nozzle assembly was closed at a time of 50 milliseconds. The solenoid valve for the nozzle assembly was opened at a time earlier than 50 milliseconds, e.g., at a time of 0.0 milliseconds. Each data point on plot 900 illustrates the relationship between nozzle flow and valve closure time as indicated by the time at which the peak coil current induced by the poppet translating to the closed position occurs.

In certain embodiments, nozzle flow is determined by the controller at determination step 780 based on experimental data for solenoid valve closing times, such as the data shown in FIGS. 8 and 9. In alternative embodiments, nozzle flow is determined according to a mathematical relationship characterized by Eq. 1 above. The method ends at an end step 790.

Although systems and methods are described above with reference to an agricultural spray system, embodiments of the present disclosure are suitable for use with agricultural fluid application systems other than spray systems. In some embodiments, for example, the systems and methods of the present disclosure are implemented in a fluid application system that injects fluid, such as fertilizer, into the soil through dispensing tubes, rather than spray nozzles.

Figure 10:
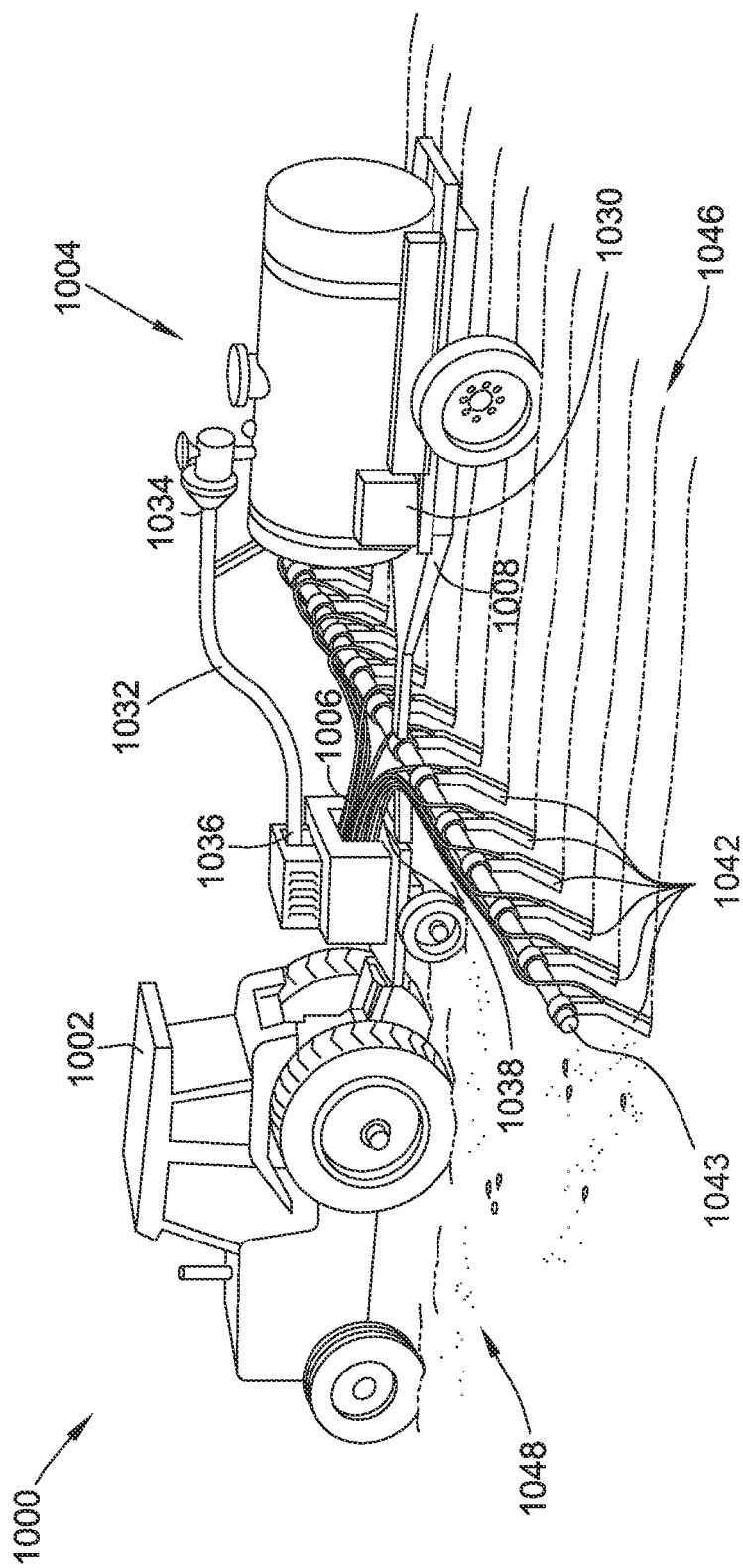
FIG. 10 is a perspective view of a fluid application system.

FIG. 10 is a perspective view of one embodiment of a fluid application system 1000. Fluid application system 1000 includes a volatile liquid fertilizer application system for application of fertilizers such as, for example, anhydrous ammonia. Fluid application system 1000 includes a motorized vehicle 1002, a fluid storage tank 1004, and a distribution manifold 1006. Motorized vehicle 1002 may be any machine that enables fluid application system 1000 to function as described herein. In suitable embodiments, one or more components of fluid application system 1000 may be incorporated into motorized vehicle 1002 without departing from some aspects of this disclosure. In the exemplary embodiment, fluid storage tank 1004 and distribution manifold 1006 are disposed on a wheeled chassis 1008 towed behind motorized vehicle 1002.

During operation, fluid storage tank 1004 may contain any type of fluid for distribution by fluid application system 1000. For example, fluid storage tank 1004 may store a volatile fluid intended to be applied to fields for agricultural purposes. A common fluid used for agricultural purposes is anhydrous ammonia, which is applied to fields primarily as a fertilizer to increase the nutrient level of soils. The anhydrous ammonia includes at least some gaseous substance and, therefore, is maintained at a carefully controlled pressure to control the gaseous properties. In the exemplary embodiment, fluid storage tank 1004 is configured to store and maintain the fluid at a desired pressure as fluid flows out of the fluid storage tank. Fluid application system 1000 includes at least one pump 1030 connected to fluid storage tank 1004 to facilitate maintaining the fluid in the fluid storage tank at the desired pressure.

In the exemplary embodiment, fluid storage tank 1004 is fluidly connected to a distribution manifold 1006 by a fluid line 1032. Disposed between distribution manifold 1006 and fluid storage tank 1004 is a valve 1036 and quick connect 1034. In suitable embodiments, quick connect 1034 and valve 1036 may be coupled to any portions of fluid application system 1000. For example, in some suitable embodiments, any of quick connect 1034 and valve 1036 may be omitted without departing from some aspects of this disclosure. In the exemplary embodiment, quick connect 1034 facilitates fluid storage tank 1004 being connected to and removed from fluid line 1032. Valve 1036 controls fluid flow through fluid line 1032. For example, valve 1036 is positionable between a closed position where fluid is inhibited from flowing through fluid line 1032 and an open position where fluid is allowed to flow through fluid line 1032. In certain embodiments, valve 1036 may be any valve that enables fluid application system 1000 to function as described herein.

Figure 11:
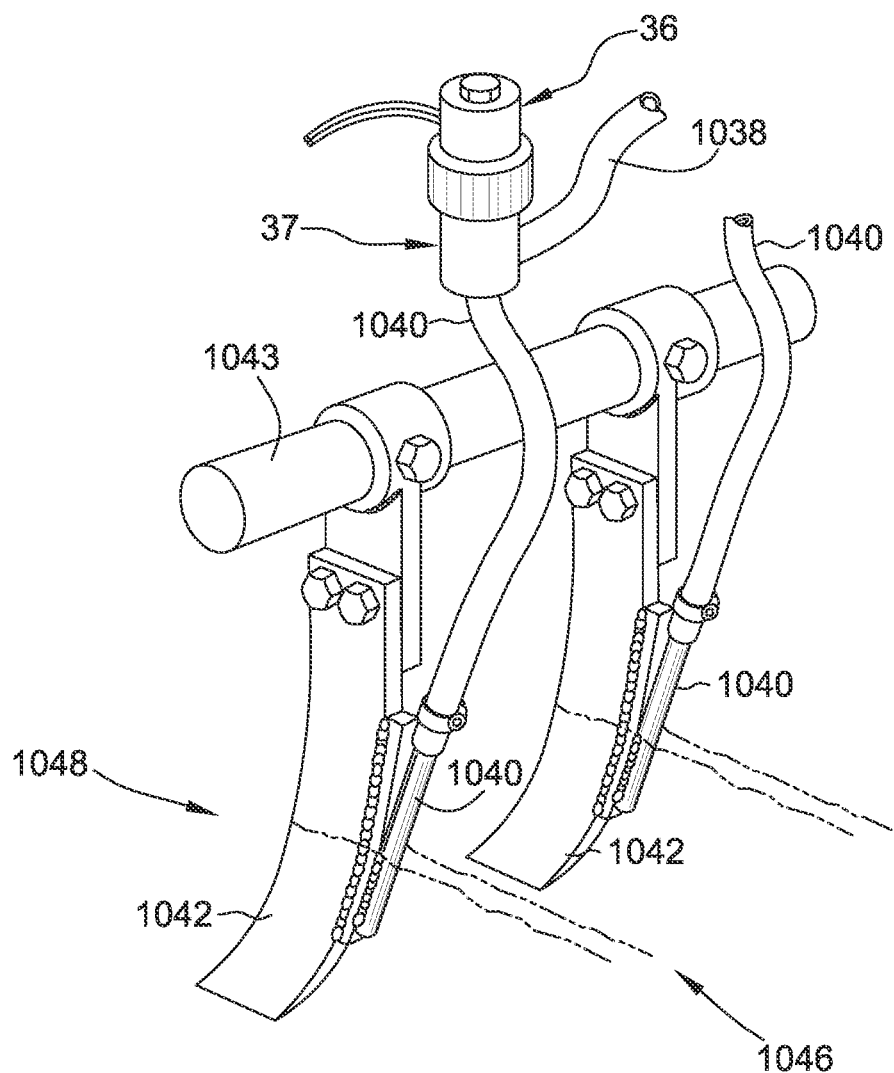
FIG. 11 is a perspective view of a portion of the fluid application system shown in FIG. 10.

The fluid is directed from fluid line 1032 through valve 1036 and into distribution manifold 1006. As shown in FIGS. 10 and 11, distribution manifold 1006 includes a plurality of supply lines 1038 each connected to valve assemblies 36. Each valve assembly 36 regulates flow of the fluid through a nozzle body 37 and into a dispensing tube 1040 for injecting the fluid into a soil. Distribution manifold 1006 distributes the fluid to valve assemblies 36 and dispensing tubes 1040 for emitting the fluid from fluid application system 1000.

Each valve assembly 36 is controlled by a controller, such as controllers 318 or 414 described above with reference to FIGS. 3 and 4, respectively. The controller may be configured to determine or estimate fluid flow through dispensing tubes 1040 based on a valve closure time using the methods described above with reference to FIGS. 6 and 7. More specifically, the controller may be configured to determine or estimate fluid flow through dispensing tubes 1040 based on a time delay between de-energizing a solenoid coil within valve assembly 36 and a measured poppet closure time, as described in more detail herein with reference to FIGS. 6 and 7.

In suitable embodiments, fluid application system 1000 may include any number of dispensing tubes 1040. In some embodiments, as the fluid is emitted from dispensing tubes 1040, vehicle 1002 moves fluid application system 1000 along a desired path for fluid application, such as rows 1046 of a field 1048. In the exemplary embodiment, dispensing tubes 1040 are connected to or positioned behind a soil preparation mechanism 1042, such as a knife or plow, that contacts the soil as dispensing tubes 1040 dispense fluid onto the soil, as best seen in FIG. 11. Soil preparation mechanisms 1042 are connected to a boom 1043, which is connected to and pulled behind vehicle 1002.

The systems and methods described herein provide fluid flow measurements through a solenoid valve. For example, in spray systems within which the systems and methods may be embodied or carried out, fluid flow may be determined and presented to the operator. Additionally, determined fluid flow may be compared to a target fluid flow for the spray system or further compared to determined fluid flows from adjacent nozzle assemblies. The comparison of measured fluid flow to a target fluid flow facilitates determining whether a particular nozzle assembly is functioning properly. The determined fluid flow measurements facilitate determining, during operation, the state of the various nozzle assemblies on the spray system that are otherwise difficult to ascertain during operation. The systems described herein may include diagnostic capabilities derived from the determined fluid flow through the solenoid valve. For example, the system may be able to determine if valve 36 contains debris lodging it open or closed, if spray nozzle 39 is partially or fully clogged, if spray nozzle 39 has fallen off of nozzle body 37, or if a spray boom section is failing to receive flow due to a conduit problem or section valve malfunction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A fluid application system comprising:
   a fluid dispensing outlet;
   a solenoid valve coupled in fluid communication with the fluid dispensing outlet and configured to regulate flow of fluid through the fluid dispensing outlet, the solenoid valve comprising a coil and a poppet; and
   a drive circuit configured to energize and de-energize the coil of the solenoid valve to translate the poppet of the solenoid valve between an open position and a closed position, the drive circuit comprising a controller configured to:
   determine a closing time of the solenoid valve,
   determine a time delay between de-energizing the coil and the determined closing time of the solenoid valve, and
   determine a fluid flow value of fluid flowing through the solenoid valve based on the time delay.

2. The fluid application system of claim 1, wherein the drive circuit comprises:
   a drive switch operable to de-energize the coil to translate the poppet toward a closed position;
   a sensor configured to detect the poppet translating within the solenoid valve, wherein the controller is configured to:
   receive a closure signal from the sensor; and
   determine the closing time of the solenoid valve based on the closure signal.

3. The fluid application system of claim 2, wherein the drive switch comprises a field effect transistor (FET).

4. The fluid application system of claim 2 further comprising a fly-back diode coupled in parallel with the coil.

5. The fluid application system of claim 2, wherein the sensor comprises an accelerometer coupled to the solenoid valve.

6. The fluid application system of claim 2, wherein the controller is further configured to generate a control signal to control the drive switch.

7. The fluid application system of claim 1, wherein the controller is further configured to determine the closing time of the solenoid valve based on a coil current value.

8. The fluid application system of claim 1, wherein the controller is further configured to:
   generate a first signal for controlling the drive circuit to energize and de-energize the coil; and
   generate a second signal for controlling a fly-back switch.

9. The fluid application system of claim 8, wherein the drive circuit comprises a drive switch coupled between a coil power source and the coil of the solenoid valve, the drive switch operable to de-energize the coil to translate the poppet within the coil toward the closed position.

10. The fluid application system of claim 1, wherein the controller is further configured to compare the fluid flow value to a target flow value.

11. The fluid application system of claim 1, wherein the drive circuit comprises a fly-back diode coupled in series with a fly-back switch.

12. The fluid application system of claim 1, wherein the controller is further configured to determine the fluid flow value based on a fluid pressure drop across the poppet of the solenoid valve.

13. The fluid application system of claim 1, wherein the controller is further configured to determine the closing time of the solenoid valve based on detected movement of the poppet.

14. The fluid application system of claim 1 further comprising a user interface coupled to the controller and configured to present the fluid flow value to a user.

15. The fluid application system of claim 14, wherein the controller is further configured to determine an operating state of the solenoid valve based on the fluid flow value.

16. The fluid application system of claim 15, wherein the controller is further configured to compare the fluid flow value to respective fluid flow values of adjacent fluid dispensing outlets of the fluid application system to determine the operating state of the solenoid valve based on the fluid flow value.

* * * * *